United States Patent
Rajkhowa et al.

(10) Patent No.: US 11,282,027 B2
(45) Date of Patent: Mar. 22, 2022

(54) SYSTEM AND METHOD OF DELIVERY ASSIGNMENT

(71) Applicant: Walmart Apollo, LLC, Bentonville, AR (US)

(72) Inventors: Pratosh Deepak Rajkhowa, Sunnyvale, CA (US); Manish Gupta, Sunnyvale, CA (US); Chika Ugboh, Redwood City, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 346 days.

(21) Appl. No.: 16/395,687

(22) Filed: Apr. 26, 2019

(65) Prior Publication Data
US 2020/0342402 A1   Oct. 29, 2020

(51) Int. Cl.
*G06Q 10/08* (2012.01)
*G06Q 10/06* (2012.01)
*G06Q 10/04* (2012.01)

(52) U.S. Cl.
CPC ..... *G06Q 10/08355* (2013.01); *G06Q 10/047* (2013.01); *G06Q 10/063118* (2013.01)

(58) Field of Classification Search
CPC ........... G06Q 10/08355; G06Q 10/047; G06Q 10/063118
USPC ........................................................ 705/338
See application file for complete search history.

(56) References Cited

U.S. PATENT DOCUMENTS

| | | | |
|---|---|---|---|
| 9,710,779 B1* | 7/2017 | Maloney | G06Q 10/08355 |
| 2014/0278635 A1* | 9/2014 | Fulton | G06Q 10/063112 |
| | | | 705/7.14 |
| 2020/0097900 A1* | 3/2020 | Kibbey | G06Q 10/0832 |

OTHER PUBLICATIONS

"System for Optimally Shipping Items to Minimize Costs" Published by Technical Disclosure Commons (Year: 2018).*

* cited by examiner

*Primary Examiner* — Zeina Elchanti
(74) *Attorney, Agent, or Firm* — Duane Morris LLP; Manita Rawat (57) ABSTRACT

A system and method of driver selection is disclosed. At least one order including a delivery window is received and a first delivery assignment process is implemented during a first time period. The first time period occurs a predetermined time before the delivery window. An indication regarding the first delivery assignment process is received and a second delivery assignment process is implemented during a second time period when the indication regarding the first delivery assignment process indicates the first delivery assignment process failed to place the at least one order with a driver. The second time period is subsequent to the first time period. An indication regarding the second delivery assignment process is received.

20 Claims, 6 Drawing Sheets

SYSTEM AND METHOD OF DELIVERY ASSIGNMENT

TECHNICAL FIELD

This application relates generally to order delivery systems and, more specifically, relates to systems and methods for assigning orders to drivers or delivery services.

BACKGROUND

Driver matching for deliveries generated by an automated delivery system, such as a grocery system, requires selection of the "right" driver for an order such that the driver accepts the order and completes the order. Current systems use a broadcast method that provides all potential orders to all potential drivers and allows drivers to select orders on a first come-first serve basis. However, such systems allow a few drivers to monopolize orders and fail to incentivize new or lower volume drivers from participating in the system.

In some instances, multiple delivery systems, such as an independent delivery system, a commercial delivery system, and/or other systems may each be used to deliver a subset of orders generated by an automated system. Current systems dispatch orders to all available delivery systems without attempting to match individuals orders to individual delivery systems.

SUMMARY

In various embodiments, a system is disclosed. The system includes a computing device configured receive at least one order including a delivery window and implement a first delivery assignment process during a first time period. The first time period occurs a predetermined time before the delivery window. The computing system is further configured to receive an indication regarding the first delivery assignment process and implement a second delivery assignment process during a second time period. The second time period is subsequent to the first time period and the second delivery assignment process is implemented when the indication regarding the first delivery assignment process indicates the first delivery assignment process failed to place the at least one order with a driver. The computing device is configured to receive an indication regarding the second delivery assignment process.

In various embodiments, a non-transitory computer readable medium having instructions stored thereon is disclosed. The instructions, when executed by a processor cause a device to perform operations including receiving at least one order including a delivery window and implementing a first delivery assignment process during a first time period. The first time period occurs a predetermined time before the delivery window. An indication regarding the first delivery assignment process is received and a second delivery assignment process is implemented during a second time period when the indication regarding the first delivery assignment process indicates the first delivery assignment process failed to place the at least one order with a driver. The second time period is subsequent to the first time period. An indication regarding the second delivery assignment process is received.

In various embodiments, a method is disclosed. The method includes a step of receiving at least one order including a delivery window and implementing a first delivery assignment process during a first time period. The first time period occurs a predetermined time before the delivery window. An indication regarding the first delivery assignment process is received and a second delivery assignment process is implemented during a second time period when the indication regarding the first delivery assignment process indicates the first delivery assignment process failed to place the at least one order with a driver. The second time period is subsequent to the first time period. An indication regarding the second delivery assignment process is received.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

Figure 1:
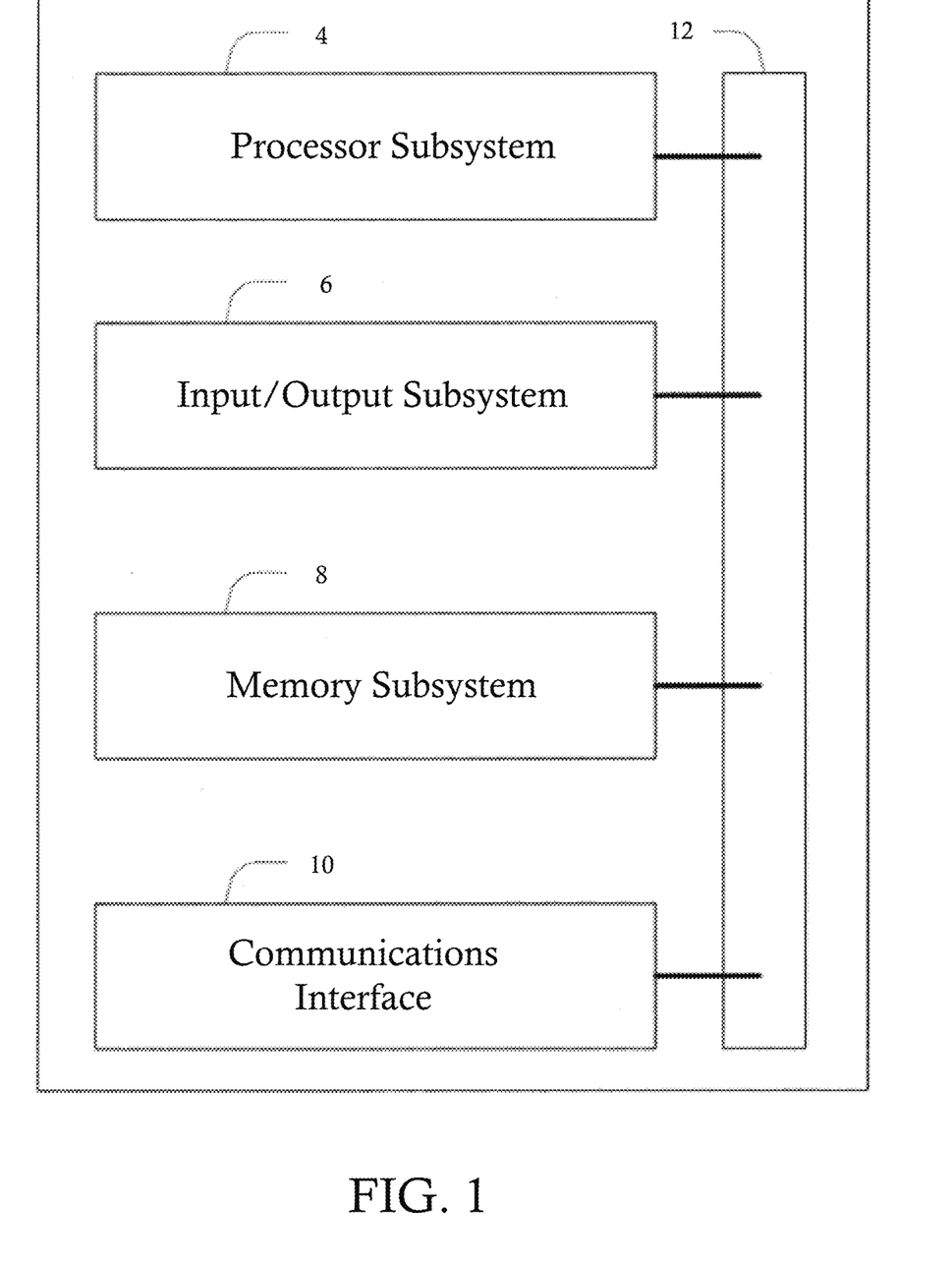
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
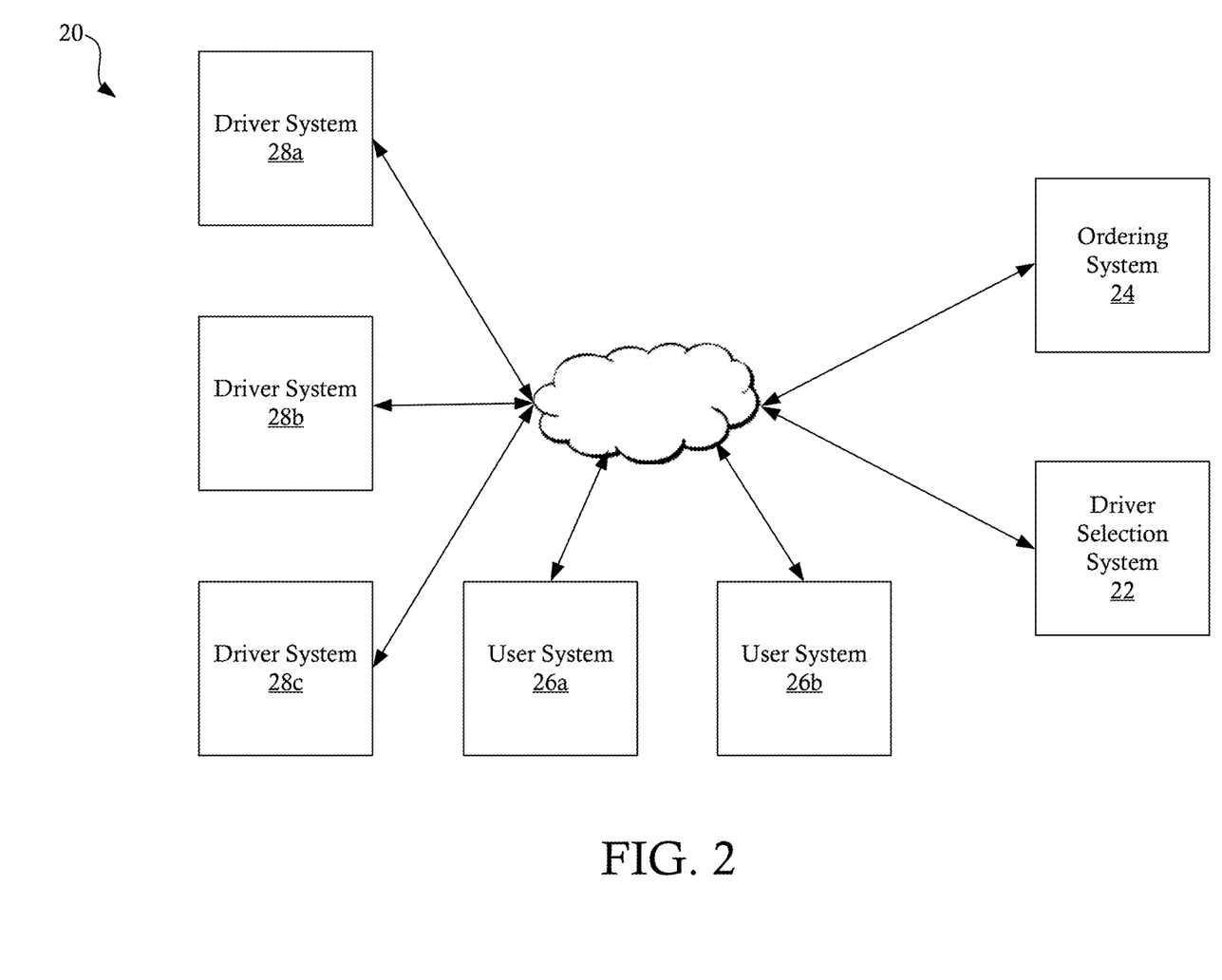
FIG. 2 illustrates a network configured to provide driver matching using a plurality of delivery assignment processes, in accordance with some embodiments.

FIG. 2 illustrates a network 20 configured to perform order matching using a plurality of delivery assignment processes, in accordance with some embodiments. In some embodiments, the network 20 includes a delivery selection system 22, an ordering system 24, a plurality of user systems 26a-26b, and a plurality of delivery systems 28a-28c. Each of the delivery selection system 22, the ordering system 24, the user systems 26a-26b, and/or the delivery systems 28a-28c comprise a system 2, as described above. Although various embodiments are disclosed herein, it will be appreciated that the systems 22-28c discussed herein can be combined into one or more systems, such as, for example, a single system performing the functions of both a delivery selection system 22 and an ordering system 24. It will be appreciated that any number of combinations of systems and/or additional systems may be included in the network 20.

In some embodiments, the ordering system 24 is configured to receive one or more orders. For example, in various embodiments, the ordering system 24 may be configured to receive grocery orders, perishable product orders, service orders, and/or other time-sensitive orders. The ordering system 24 is configured to assign each received order to one of a plurality of delivery slots, such as, for example, hourly slots, multiple hour delivery slots, daily slots, etc. After assigning each order to a delivery slot, the ordering system 24 provides the order to a delivery selection system 22. The ordering system 24 and/or the delivery selection system 22 may be configured to receive and assign orders for a single source location (e.g., a single store, warehouse, distribution center, etc.) and/or a plurality of source locations. In some embodiments, the plurality of source locations may be located in a common geographic area.

In some embodiments, the delivery selection system 22 is configured to receive one or more delivery profiles for one or more drivers and/or delivery platforms. The delivery profiles may be generated by individual drivers or platforms when registering with the delivery selection system 22. In some embodiments, the delivery selection system 22 implements a delivery assignment process that generates offers for one or more drivers or services to deliver specific orders. The individual drivers or platforms, using one or more delivery systems 28a-28c, may indicate their acceptance of specific orders and/or indicate specific preferences for orders. In some embodiments, delivery-specific preferences include delivery location preferences (e.g., radii around one or more source locations), time slot preferences, number of deliveries desired, delivery rates, and/or any other suitable delivery-specific preferences.

In some embodiments, the delivery selection system 22 is configured to implement an order assignment process, as discussed in greater detail below with respect to FIG. 4, to select and assign a driver or service to each order received from the ordering system 24. The delivery selection system 22 can be configured to perform delivery selection for each received order on a rolling basis, on a batch basis, and/or using any other suitable processing. In some embodiments, the delivery selection system 22 implements a plurality of driver assignment processes on a time-slot or rolling basis, as discussed in greater detail below. The delivery selection system 22 is configured to select a preferred delivery assignment, based on system preferences, order details, etc.

Figure 3:
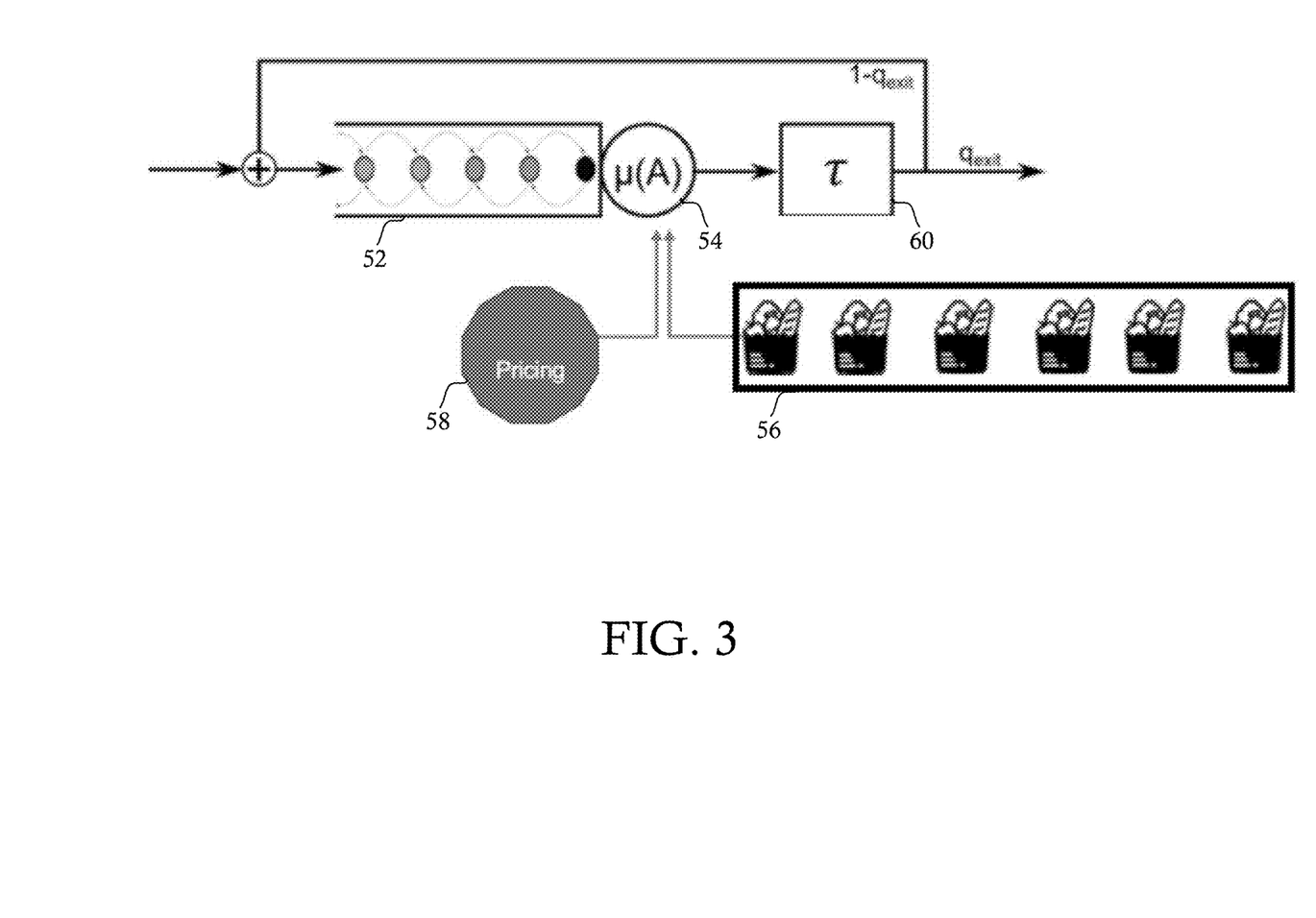
FIG. 3 illustrates a driver selection process, in accordance with some embodiments.

In some embodiments, as illustrated in FIG. 3, a delivery assignment process may be represented as a "Jackson Queue" 50. Delivery profiles are received by the system and added to a set of available profiles 52. The delivery selection system 22 implements a delivery selection process 54, such as the delivery selection processes 100 discussed in greater detail below. For each order received from the order queue 56, the delivery selection process 54 selects a delivery method from the set of available profiles and generates pricing for the delivery based on a pricing model 58. When an order is accepted, the driver selection system implements an assignment process 60 to remove the order and the profile from the current available queues 52, 56. After accepting an order, a profile may be returned to the set of available profiles 52 and/or be removed (e.g., the service is no longer accepting orders).

For example, when receiving an order, the delivery selection system 22 may be configured to attempt to place the order using a first delivery assignment process during a first time period. The delivery selection system 22 may implement any suitable driver selection process, such as, for example, a round-robin selection process, a broadcast selection process, a broadcast with incentive selection process, a commercial service placement process, etc. If the first time period elapses without the order being accepted, the delivery selection system 22 may adjust one or more parameters of the delivery offer (e.g., the price paid for the order) and/or may attempt to place the order using a second delivery assignment process during a second time period. If the second time period elapses without the order being accepted, the delivery selection system 22 may again adjust one or more parameters of the delivery offer and/or may attempt to place the order using a third delivery assignment process during a third time period. The delivery selection system 22 may continue to attempt to place the order by modifying the parameters of a delivery request and/or using alternative delivery assignment processes, such as a commercial placement process.

In some embodiments, the delivery selection system 22 is configured to generate and/or receive feedback, for example, from one or more user systems 26a, 26b and/or one or more delivery systems 28a-28c. In some embodiments, the delivery selection system 22 is configured to receive feedback including, but not limited to, individual driver acceptance rate, acceptance position (i.e., which driver in a dispatch system accepted an order), and/or any other suitable feedback. In some embodiments, the delivery selection system 22 is configured to generate additional feedback and/or statistics, such as, for example, acceptance rate for groups of drivers grouped based on one or more selected criteria. The delivery selection system 22 may be configured to select an order of delivery assignment processes, length of specific time periods, and/or other parameters of one or more assignment processes based on received and/or derived feedback.

In some embodiments, the delivery selection system 22 is in signal communication with the one or more delivery systems 28a-28c. The delivery selection system 22 is configured to transmit delivery requests to one or more delivery systems 28a-28c during each delivery assignment process. If the delivery selection system 22 receives a positive response (e.g., an acceptance of a delivery request) during a delivery assignment process, the delivery selection system 22 assigns the current order to the driver and/or delivery service providing the positive response and ceases execution of delivery assignment processes.

Figure 4:
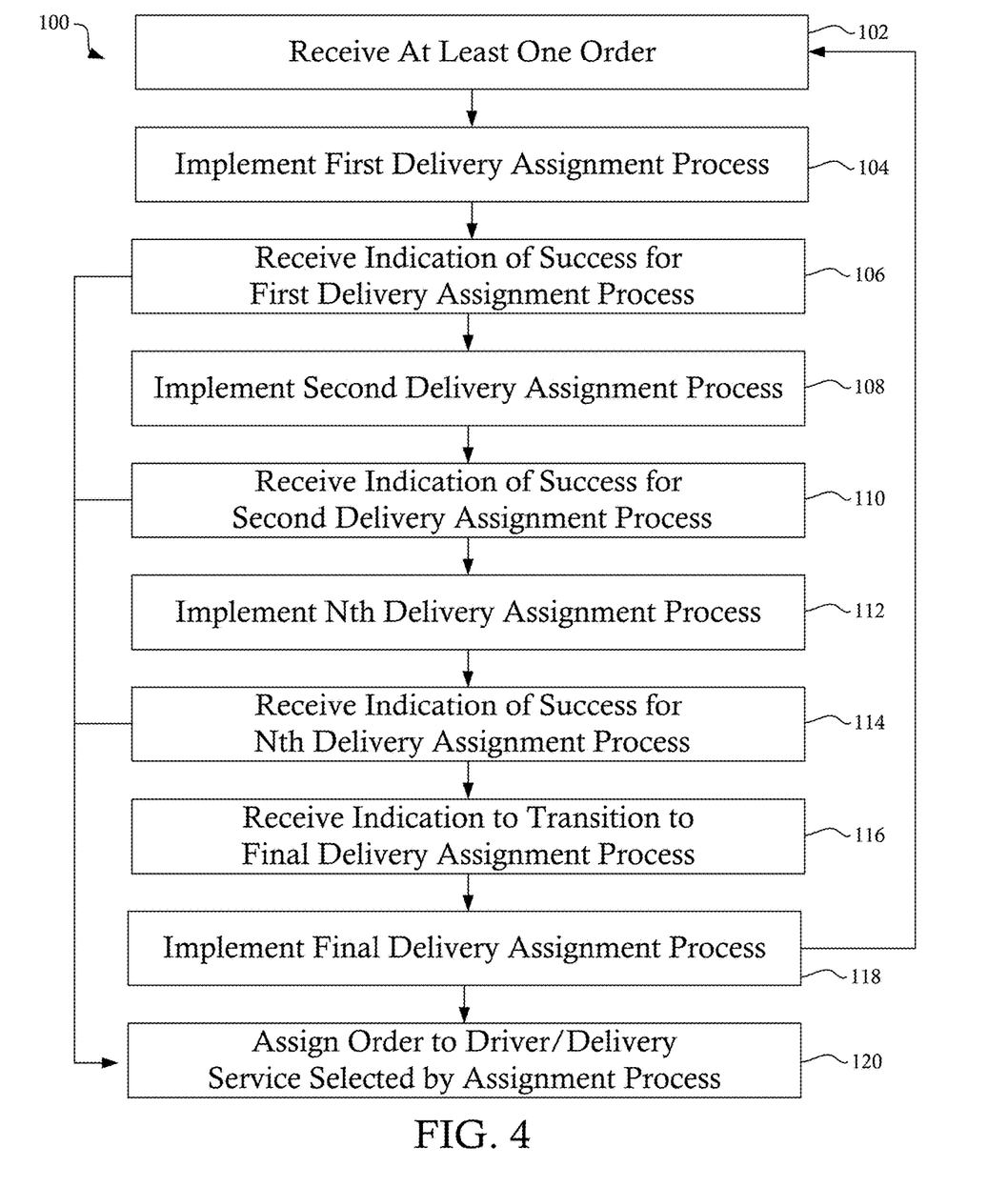
FIG. 4 illustrates a method of delivery selection using a plurality of delivery assignment processes, in accordance with some embodiments.
Figure 5:
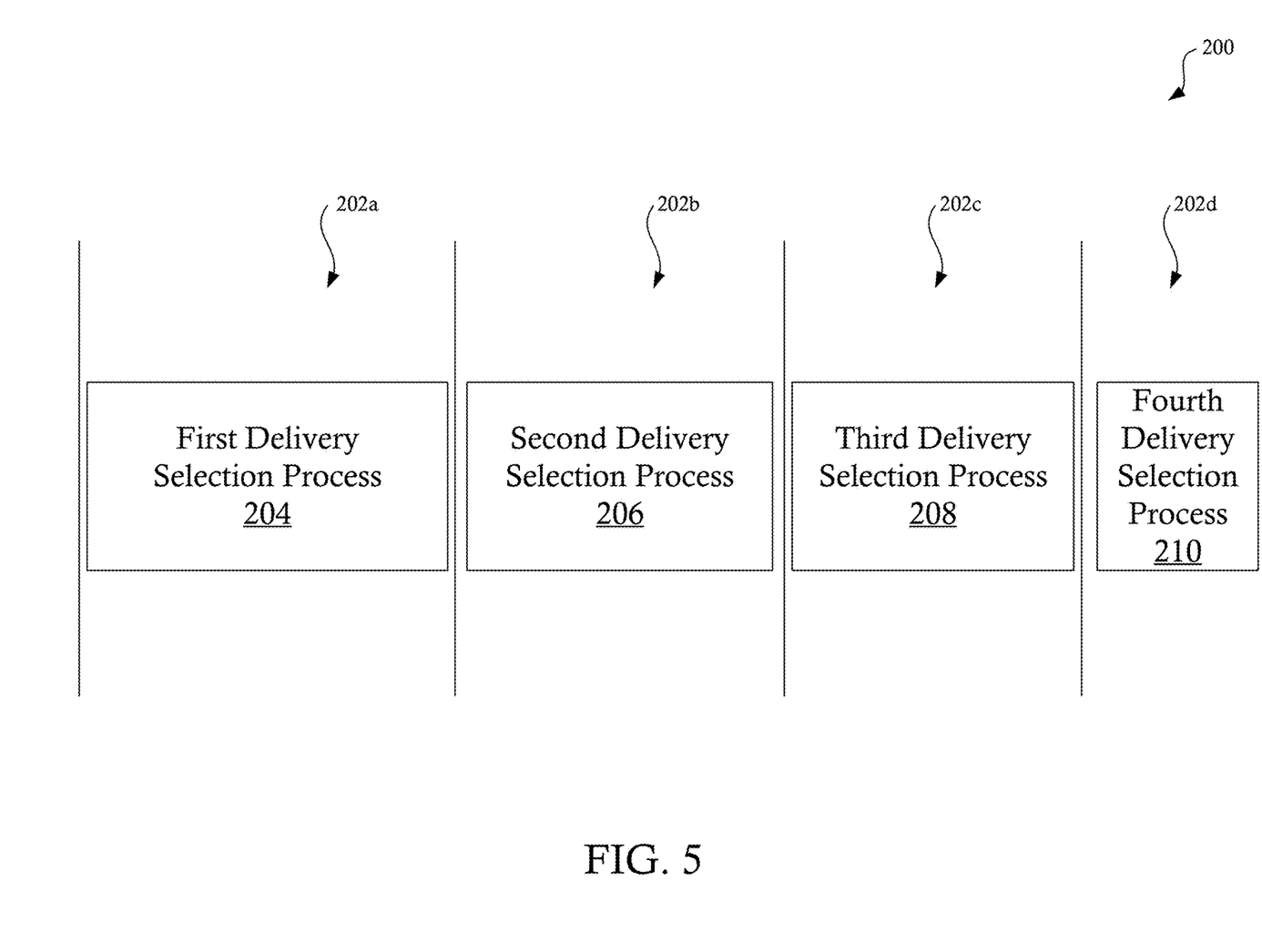
FIG. 5 illustrates an assignment flow for the method of delivery selection of FIG. 4, in accordance with some embodiments.

FIG. 4 illustrates a method of order assignment 100 using a plurality of delivery assignment processes, in accordance with some embodiments. FIG. 5 illustrates an assignment flow 200 for the method of order assignment 100, in accordance with some embodiments. The method of order assignment 100 is configured to be implemented by one or more systems, such as, for example, the delivery selection system 22 discussed above. The method 100 is configured to place an order with a driver or delivery service using one or more driver assignment processes implemented during consecutive time periods with respect to the time until the selected order slot and/or other criteria, as discussed below.

At step 102, the delivery selection system 22 receives an order, for example, from the ordering system 24. The order includes one or more order parameters, such as, for example, a source location (e.g., a store, warehouse, etc.), a delivery location, a delivery slot (e.g., a time slot), a delivery size, and/or any other suitable order parameters. In some embodiments, the order includes one or more time-sensitive and/or perishable products.

At step 104, the delivery selection system 22 implements a first delivery assignment process 204 to attempt to place the received order with a driver during a first time period 202a. The first time period 202a begins a predetermined time before the delivery slot included in the order, such as, for example, 120 minutes before the delivery slot, 180 minutes before the delivery slot, 240 minutes before the delivery slot, 300 minutes before the delivery slot, and/or any other suitable time period before the delivery slot. The delivery selection system 22 may implement any suitable delivery assignment process 204 during the first time period 202a, such as, for example, a round-robin delivery assignment process (as disclosed in U.S. patent application Ser. No. 16/397,940, filed Apr. 29, 2019, filed concurrently with the present application), a broadcast delivery assignment process, a broadcast with incentives delivery assignment process, a commercial service assignment process, and/or any other suitable delivery assignment process.

In some embodiments, a round-robin delivery assignment process may be configured to select individual drivers to receive a delivery request based on one or more rankings of drivers. In some embodiments, a broadcast delivery assignment process transmits a delivery request to a predetermined set of drivers and/or delivery services, for example, all drivers within a selected geographic area. In some embodiments, a broadcast with incentive delivery assignment process repeatedly transmits a delivery request to a predetermined set of drivers while varying one or more parameters, such as, for example, the price to be paid for accepting the delivery (e.g., surge pricing), preferences for future deliveries, etc. In some embodiments, a commercial service assignment process assigns an order to a commercial delivery service charging a fixed price for certain deliveries. Although specific embodiments are discussed herein, it will be appreciated that the delivery selection system 22 can implement any suitable set of delivery assignment processes.

The delivery selection system 22 attempts to place the order using the first delivery assignment process 204 during the first time period 202a. At step 106, the delivery selection system 22 receives an indication of success for placement of the order. If the order is accepted by a driver (e.g., the indication of success is positive) during the first time period 202a, the method 100 transitions to step 120 and assigns the order to the selected driver. A positive indication of success may include, but is not limited to a confirmation message received from a delivery system 28a-28c indicating acceptance of a delivery request. If the order is not accepted during the first time period 202a (e.g., the indication of success is negative), the delivery selection system 22 transitions to step 108. Negative indications may include, but are not limited to, expiration of a predetermined time period (e.g., the first time period 202a), identification that all drivers in a given group (e.g., selected by the round-robin assignment process) have been polled and have rejected the delivery offer, lack of positive indication, and/or any other indication that the first delivery assignment process was unsuccessful.

If the first delivery assignment process 204 is unsuccessful, the delivery selection system 22 attempts to place the order using a second order placement process 206 at step 108. The second order placement process 206 can include any suitable delivery assignment process, such as, for example, a round-robin delivery assignment process, a broadcast delivery assignment process, a broadcast with incentive delivery assignment process, a commercial service assignment process, etc. The first driver selection process 204 may be stopped and/or may continue to be executed simultaneously with the second driver selection process 206 during the second time period 202b (assuming the first and second driver selection processes 204, 206 are not mutually exclusive). At step 110, the delivery selection system 22 receives an indication of success regarding the second delivery assignment process 206. If the order is accepted during the second time period 202b, the method 100 transitions to step 120 and assigns the order. If the order is not accepted during the second time period 202b, the method 100 proceeds to step 112. The received indication may be similar to and/or different from the indication received regarding the first delivery assignment process 204 at step 106.

If the second delivery assignment process 206 is unsuccessful, the delivery selection system 22 attempts to place the order using an nth delivery assignment process 208 at step 112. The nth delivery assignment process is executed during the nth time period 202c. The nth delivery assignment process can include any suitable delivery assignment process, such as, for example, a round-robin delivery assignment process, a broadcast delivery assignment process, a broadcast with incentives delivery assignment process, a commercial service assignment process, etc. The first and second delivery assignment processes 204, 206 may be stopped and/or may continue to be executed simultaneously with the nth delivery assignment process 208 during the nth time period 202c. At step 114, the delivery selection system 22 receives an indication of success regarding the nth delivery assignment process 208. If the order is accepted by a driver during the nth time period 202c, the method 100 transitions to step 120 and assigns the order. If the order is not accepted during the nth time period 202c, the delivery selection system 22 may repeat steps 112-114 to implement additional delivery assignment processes.

The delivery selection system 22 may continue to iterate through additional delivery assignment processes during subsequent time periods. For each subsequent time period, the delivery selection system 22 may implement a new or modified driver selection process to attempt to place the order with one or more drivers or delivery services. At step 116, the delivery selection system 22 receives an indication to transition to a final driver selection process 210 during a final time period 202d. The received indication may be similar to and/or different from the indication received for prior delivery assignment processes 204-208. For example, in some embodiments, the received indication may be a time based indication (e.g., the time remaining prior to the delivery slot of the order is less than or equal to a predetermined threshold), price based (e.g., the price generated during a prior driver selection process is equal to or above the price of delivery using a commercial delivery service as discussed below), and/or any other suitable indication.

At step 118, the delivery selection system 22 implements a final delivery assignment process 210. The final delivery assignment process 210 is configured to assign the received order to a high-acceptance rate delivery driver and/or service, such as, for example, a third-party commercial delivery service. If the order is accepted by the high-acceptance acceptance rate delivery service (which is a likely outcome), the method 100 transitions to step 120 and assigns the order. If the high-acceptance rate delivery service does not accept the order (unlikely), the order is assigned a new order delivery window. The method 100 returns to step 104 and attempts to place the order in the new order window.

At step 120, the delivery selection system 22 assigns the order to the driver and/or delivery service selected during one of the delivery assignment processes 204-210. The delivery selection system 22 may be configured to assign individual orders, batches of orders, etc.

Although embodiments are illustrated that proceed through delivery assignment processes 204-210 in a predetermined order, it will be appreciated that the delivery selection system 22 may be configured to adjust the order of delivery assignment processes 204-210 and/or skip one or more delivery assignment processes 204-210. For example, in some embodiments, the delivery selection system 22 implements one or more machine learning processes configured to receive feedback based on the success and/or failure of various delivery assignment processes 204-210. The machine learning processes may generate modifications to alter the order of delivery assignment processes 204-210, add/remove delivery assignment processes 204-210, and/or otherwise optimize order of execution for the various delivery assignment processes 204-210. The machine learning processes may include any suitable process, such as, for example, a decision tree process configured to generate a model to predict a value of a target variable based on one or more input variables (such as a boosted tree process, bootstrap aggregated process, etc.), a random forest process configured to perform classification, regression, etc. to construct a multitude of decision trees at training time to generate a class that is a mode of classes (classification) or mean prediction (regression) of the individually generated trees, a neural network configured for predictive modeling, adaptive control, etc. trained via a predetermined dataset to provide self-learning derived from one or more conclusions based on the data set, logistic regression including a binary logistic model having a dependent variable with two possible values represented by an indicator variable, and/or any other suitable machine learning process.

In some embodiments, the machine learning process is configured to modify the order of delivery assignment processes 204-210 based on feedback received from the delivery selection system 22. For example, in various embodiments, the machine learning process may be configured to modify the order of delivery assignment processes based on successful order placement rate for one or more delivery assignment processes 204-210, successful order completion rate for one or more delivery assignment processes 204-210, pattern of acceptance for a location (e.g., source location) or delivery assignment process 204-210, delivery time slot, delivery location, etc.

In some embodiments, the type and order of delivery assignment processes 204-210 may be adjusted based on order parameters, such as, for example, delivery time slot, delivery day, delivery requirements, delivery size, source location, etc. For example, in some embodiments, a machine learning process may determine a first order of delivery assignment processes 204-210 to be implemented during low-volume time periods and a second order of delivery assignment processes 204-210 to be implemented during a high-volume time period. It will be appreciated that the order, type, etc. of delivery assignment processes 204-210 can be selected based on any suitable variable.

In some embodiments, the delivery selection system 22 is configured to select a third party commercial delivery services from a plurality of third party delivery services. For example, at step 118, the delivery selection system 22 may select a third party commercial delivery service based on historic order information for the third party delivery services and/or order parameters. Historic order information may include, but is not limited to, delivery rates, acceptance rates, on-time delivery rates, package damage rates, etc. Applicable order parameters may include delivery location, source location, delivery time slot, etc.

In some embodiments, the delivery selection system 22 is configured to modify one or more parameters of a delivery order offer within a time period 202a-202d. For example, in some embodiments, the delivery selection system 22 is configured to increase a price offered for delivery of an order during each iteration of a delivery selection process 204-210. In some embodiments, a subsequent delivery selection process 206-210 is initiated when a price offered during an earlier delivery selection process 204-208 equals or exceeds a predetermined threshold. For example, in some embodiments, a broadcast delivery selection process 208 may increase a price offered for a delivery during each subsequent broadcast of the delivery offer up to a price equal to the cost of hiring a third party delivery service to deliver the order (e.g., the price of the final delivery selection process 210). It will be appreciated that any suitable parameters of an order offer may be adjusted by the delivery selection system 22 during any time period 202a-202d.

In some embodiments, the delivery selection system 22 is configured to implement a predetermined order of delivery assignment processes. For example, and without limitation, the first delivery assignment process 204 may include a round-robin delivery assignment process, the second delivery assignment process 206 may include a broadcast delivery assignment process, a third delivery assignment process 208 may include a broadcast with incentives delivery assignment process, and a fourth delivery assignment process 210 may include a commercial service assignment process. Although specific embodiments are discussed herein, it will be appreciated that the delivery selection system 22 can implement the delivery assignment processes in any suitable order or during any time period 202a-202d.

Figure 6:
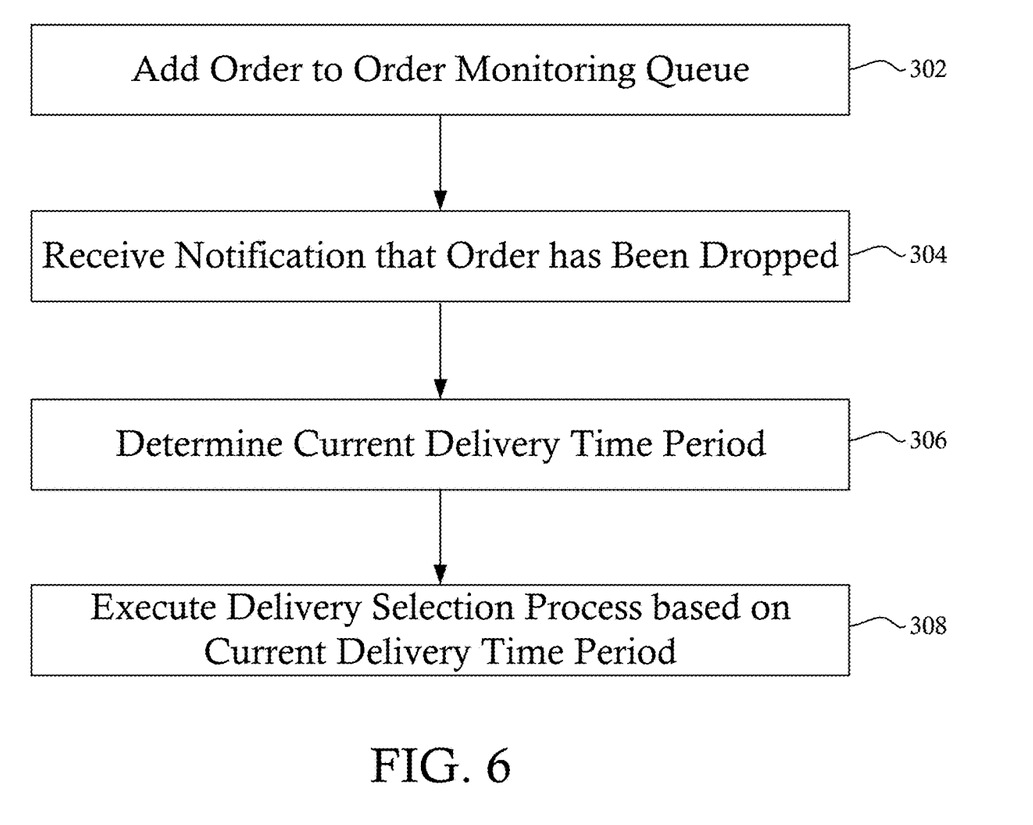
FIG. 6 illustrates a method of monitoring an assigned order, in accordance with some embodiments.

FIG. 6 illustrates a method of monitoring an assigned order 300, in accordance with some embodiments. After assigning an order according to the method 100, the delivery selection system 22 may implement the method 300 to monitor the order and ensure completion of the order. At step 302, the order is added to an order monitoring queue configured to periodically check the status of an assigned order. If the order is dropped by a driver that had previously accepted the order, a notification is received by the delivery selection system 22 at step 304 and the method 300 proceeds to step 306.

At step 306, the delivery selection system 22 calculates the current delivery time period 202a-202d based on the amount of time remaining prior to the delivery window for the order. For example, in some embodiments a driver may accept an order during a first time period 202a and subsequently drop the order during a third time period 202c.

At step 308, the delivery selection system 22 executes the method 100 beginning at a step corresponding to the current delivery time period 202a-202d determined at step 206. To continue the above example, if an order is dropped during a third time period 202c, the delivery selection system 22 executes an nth delivery assignment process 208 corresponding to step 114 of the method 100. By executing the method 100 at a step corresponding to the current delivery time period 202a-202d, the delivery selection system 22 increases the likelihood of the order being accepted prior to the delivery window.

Although the subject matter has been described in terms of exemplary embodiments, it is not limited thereto. Rather, the appended claims should be construed broadly, to include other variants and embodiments, which may be made by those skilled in the art.

What is claimed is:
1. A system, comprising:
   one or more processors;
   a database storing profile data of each of a plurality of drivers of a system, the profile data of each of the plurality of drivers including availability data indicating whether the corresponding driver is available for assignment, and being generated by a computing device associated with each of the plurality of drivers;
   a memory resource storing instructions, that when executed by the one or more processors, cause the one or more processors to:
      receive at least one order including a set of order parameters, the set of order parameters including a delivery window;
      obtain the profile data of one or more drivers of the plurality of drivers that include availability data indicating the corresponding driver is available for assignment;

based on the at least one order and the profile data of the one or more drivers, implement a set of delivery assignment processes, the set of delivery assignment processes including:
  implementing a first delivery assignment process that selects one of the one or more drivers for the at least one order, the first delivery assignment process being implemented during a first time period before the delivery window;
  receiving, from one or more delivery systems associated with the one or more drivers, response data indicating the first delivery assignment process failed;
  in response to and based on the response data indicating the first delivery assignment process failed:
    adjusting one or more parameters of the order parameters of the at least one order; and
    based at least on the adjusted parameters of the at least one order, implementing a second delivery assignment process that selects one of the one or more drivers to the at least one order, the second delivery assignment process being implemented during a second time period subsequent to the first time period; and
  receiving an indication regarding the second delivery assignment process.

2. The system of claim 1, wherein execution of the instructions, by the one or more processors, further causes the one or more processors to:
  select, for each of the first delivery assignment process and the second delivery assignment process, a selection process of a plurality of selection processes, the plurality of selection processes include at least one of a round-robin selection process, a broadcast selection process, a surge-pricing selection process, and a third-party assignment process.

3. The system of claim 2, wherein selection of a particular selection process is based on delivery assignment process success rates.

4. The system of claim 1, wherein execution of the instructions, by the one or more processors, further causes the one or more processors to:
  implement a third delivery assignment process during a third time period, wherein the third time period is subsequent to the second time period, and wherein the third delivery assignment process is implemented if the indication regarding the second delivery assignment process indicates the second delivery assignment process failed to place the at least one order with a driver; and
  receive an indication regarding the third delivery assignment process.

5. The system of claim 4, wherein execution of the instructions, by the one or more processors, further causes the one or more processors to:
  implement a fourth delivery assignment process during a fourth time period, wherein the fourth time period is subsequent to the third time period and at least partially overlapping with the delivery window, and wherein the fourth delivery assignment process is implemented if the indication regarding the third delivery assignment process failed to place the at least one order with a driver; and
  receive an indication regarding the fourth delivery assignment process.

6. The system of claim 1, wherein the execution of the instructions, by the one or more processors, further causes the one or more processors to:
  assign the at least one order to a first driver using the first delivery assignment process;
  receive a drop indication from the first driver; and
  assign the at least one order to a second driver using the second delivery assignment process.

7. The system of claim 6, wherein the drop indication from the first driver is received during the second time period.

8. The system of claim 1, wherein the execution of the instructions, by the one or more processors, further causes the one or more processors to apply a machine-learning model to the set of delivery assignment processes, the machine-learning model being configured to optimize an order acceptance rate.

9. A non-transitory computer readable medium having instructions stored thereon, that when executed by a processor cause a device to perform operations comprising:
  receiving at least one order including a set of order parameters, the set of order parameters including a delivery window;
  obtain profile data of one or more drivers that include availability data indicating the corresponding driver is available for assignment;
  based on the at least one order and the profile data of the one or more drivers, implement a set of delivery assignment processes, the set of delivery assignment processes including:
    implementing a first delivery assignment process that selects one of the one or more drivers to the at least one order, the first delivery assignment process being implemented during a first time period before the delivery window;
    receiving, from one or more delivery systems associated with the one or more drivers, response data indicating the first delivery assignment process failed;
    in response to and based on the response data indicating the first delivery assignment process failed:
      adjusting one or more parameters of the order parameters of the at least one order; and
      based at least on the adjusted parameters of the at least one order, implementing a second delivery assignment process that selects one of the one or more drivers to the at least one order, the second delivery assignment process being implemented, the second delivery assignment process being implemented during a second time period subsequent to the first time period; and
    receiving an indication regarding the second delivery assignment process.

10. The non-transitory computer readable medium of claim 9, wherein the execution of the instructions, by the processor, further causes the device to:
  select, for each of first delivery assignment process and the second delivery assignment process, a selection process of a plurality of selection processes, the plurality of selection processes include at least one of a round-robin selection process, a broadcast selection process, a surge-pricing selection process, and a third-party assignment process.

11. The non-transitory computer readable medium of claim 10, wherein selection of a particular selection process is delivery assignment process are selected based on delivery assignment process success rates.

12. The non-transitory computer readable medium of claim 9, wherein the instructions further cause the device to perform operations comprising:
implementing a third delivery assignment process during a third time period, wherein the third time period is subsequent to the second time period, and wherein the third delivery assignment process is implemented if the indication regarding the second delivery assignment process indicates the second delivery assignment process failed to place the at least one order with a driver; and
receiving an indication regarding the third delivery assignment process.

13. The non-transitory computer readable medium of claim 12, wherein the instructions further cause the device to perform operations comprising:
implementing a fourth delivery assignment process during a fourth time period, wherein the fourth time period is subsequent to the third time period and at least partially overlapping with the delivery window, and wherein the fourth delivery assignment process is implemented if the indication regarding the third delivery assignment process indicates the third delivery assignment process failed to place the at least one order with a driver; and
receiving an indication regarding the fourth delivery assignment process.

14. The non-transitory computer readable medium of claim 9, wherein the instructions further cause the device to perform operations comprising:
assigning the at least one order to a first driver using the first delivery assignment process;
receiving a drop indication from the first driver; and
assigning the at least one order to a second driver using the second delivery assignment process.

15. The non-transitory computer readable medium of claim 14, wherein the drop indication from the first driver is received during the second time period.

16. The non-transitory computer readable medium of claim 9, wherein execution of the instructions, by the processor, further causes the processor to apply a machine-learning model to the set of delivery assignment processes, the a machine-learning model configured to optimize an order acceptance rate.

17. A computer-implemented method, comprising:
receiving, by a processor, at least one order including a set of order parameters, the set of order parameters including a delivery window;
obtaining, by the processor, profile data of one or more drivers that include availability data indicating the corresponding driver is available for assignment;
based on the at least one order and the profile data of the one or more drivers, implementing, by the processor, a set of delivery assignment processes, the set of delivery assignment processes including:
implementing a first delivery assignment process that selects one of the one or more drivers to the at least one order, the first delivery assignment process being implemented during a first time period before the delivery window;
receiving, from one or more delivery systems associated with the one or more drivers, response data indicating the first delivery assignment process failed;
in response to and based on the response data indicating the first delivery assignment process failed:
adjusting one or more parameters of the order parameters of the at least one order; and
based at least on the adjusted parameters of the at least one order, implementing a second delivery assignment process that selects one of the one or more drivers to the at least one order, the second delivery assignment process being implemented, the second delivery assignment process being implemented during a second time period subsequent to the first time period; and
receiving an indication regarding the second delivery assignment process.

18. The computer-implemented method of claim 17, further comprising:
selecting, for each of the first delivery assignment process and the second delivery assignment process, a selection process of a plurality of selection processes, the plurality of selection processes include at least one of a round-robin selection process, a broadcast selection process, a surge-pricing selection process, and a third-party assignment process.

19. The computer-implemented method of claim 17, comprising:
implementing a third delivery assignment process during a third time period, wherein the third time period is subsequent to the second time period, and wherein the third delivery assignment process is implemented if the indication regarding the second delivery assignment process indicates the second delivery assignment process failed to place the at least one order with a driver; and
receiving an indication regarding the third delivery assignment process.

20. The computer-implemented method of claim 19, comprising:
implementing a fourth delivery assignment process during a fourth time period, wherein the fourth time period is subsequent to the third time period and at least partially overlapping with the delivery window, and wherein the fourth delivery assignment process is implemented if the indication regarding the third delivery assignment process indicates the third delivery assignment process failed to place the at least one order with a driver; and
receiving an indication regarding the fourth delivery assignment process.

* * * * *

UNITED STATES PATENT AND TRADEMARK OFFICE
CERTIFICATE OF CORRECTION

| | | |
|---|---|---|
| PATENT NO. | : 11,282,027 B2 | Page 1 of 1 |
| APPLICATION NO. | : 16/395687 | |
| DATED | : March 22, 2022 | |
| INVENTOR(S) | : Pratosh Deepak Rajkhowa et al. | |

It is certified that error appears in the above-identified patent and that said Letters Patent is hereby corrected as shown below:

On the Title Page (72) Inventors: Add the following inventors:
--Deepak Deshpande, San Jose, CA (US)
Rohit Jain, Sunnyvale, CA (US)
Pushpendra Singh, San Jose, CA (US)--

Signed and Sealed this
Thirteenth Day of February, 2024

Katherine Kelly Vidal
*Director of the United States Patent and Trademark Office*